(12) United States Patent
Chen et al.

(10) Patent No.: US 8,665,407 B2
(45) Date of Patent: Mar. 4, 2014

(54) CHIP-ON-FILM STRUCTURE FOR LIQUID CRYSTAL PANEL

(75) Inventors: Shyhfeng Chen, Shenzhen (CN); Minghung Shih, Shenzhen (CN); Meng Li, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 126 days.

(21) Appl. No.: 13/380,012

(22) PCT Filed: Nov. 23, 2011

(86) PCT No.: PCT/CN2011/082735
§ 371 (c)(1),
(2), (4) Date: Dec. 21, 2011

(87) PCT Pub. No.: WO2013/071578
PCT Pub. Date: May 23, 2013

(65) Prior Publication Data
US 2013/0120704 A1    May 16, 2013

(30) Foreign Application Priority Data
Nov. 16, 2011   (CN) .......................... 2011 1 0363152

(51) Int. Cl.
*G02F 1/1345*   (2006.01)
(52) U.S. Cl.
USPC ............................. 349/150; 349/149; 349/152
(58) Field of Classification Search
USPC ........................................................ 349/150
See application file for complete search history.

(56) References Cited

U.S. PATENT DOCUMENTS

| 5,543,660 | A | 8/1996 | Dombroski | |
|---|---|---|---|---|
| 5,670,994 | A * | 9/1997 | Kawaguchi et al. | 349/150 |
| 7,532,266 | B2 * | 5/2009 | Sun et al. | 349/150 |
| 2004/0108594 | A1 | 6/2004 | Toyosawa | |
| 2005/0218513 | A1 * | 10/2005 | Seko | 257/734 |
| 2007/0152329 | A1 | 7/2007 | Cho et al. | |
| 2009/0009706 | A1 * | 1/2009 | Kim et al. | 349/149 |
| 2010/0134712 | A1 * | 6/2010 | Tang et al. | 349/150 |
| 2010/0149775 | A1 | 6/2010 | Park et al. | |
| 2011/0210433 | A1 | 9/2011 | Cho et al. | |

FOREIGN PATENT DOCUMENTS

| CN | 1507042 | 6/2004 |
|---|---|---|
| CN | 1638103 | 7/2005 |
| CN | 1992247 | 7/2007 |
| CN | 101118897 | 2/2008 |
| CN | 101820722 | 9/2010 |

* cited by examiner

*Primary Examiner* — Bumsuk Won
*Assistant Examiner* — Ryan Crockett

(57) ABSTRACT

A chip on film (COF) structure for a liquid crystal panel is disclosed, and comprises a flexible substrate, an output edge, a first wire bonding portion, two second wire bonding portions, a fan-out trace portion, and two array trace portions. A long direction of lead strips of the second wire bonding portion is parallel to the output edge, and the array trace portions connect one end of the lead strips of the second wire bonding portion to the output edge. The design of the second wire bonding portions parallel to the output edge and turning traces of the array trace portions can lower the length of the fan-out trace portion, so that it is advantageous in a design trend of narrow frame edge of a liquid crystal panel.

11 Claims, 2 Drawing Sheets

CHIP-ON-FILM STRUCTURE FOR LIQUID CRYSTAL PANEL

FIELD OF THE INVENTION

The present invention relates to a chip-on-film (COF) structure for a liquid crystal panel, and more particularly to a COF structure which can reduce a height of a fan-out circuit.

BACKGROUND OF THE INVENTION

A liquid crystal display (LCD) is a type of flat panel display (FPD) which displays images by the property of the liquid crystal material. In comparison with other display devices, the LCD has the advantages in lightweight, compactness, low driving voltage and low power consumption, and thus has already become the mainstream product in the whole consumer market. In a traditional process of LCD panel, it comprises a front-end array process, a mid-end cell process and a back-end modulation process. The front-end array process is used to produce thin-film transistor (TFT) substrates (also called array substrates) and color filter (CF) substrates; the mid-end cell process is used to combine the TFT substrate with the CF substrate, then fill liquid crystal into a space therebetween, and cut to form panels with a suitable product size; and the back-end modulation process is used to execute an installation process of the combined panel, a backlight module, a panel driver circuit, an outer frame, etc.

An assembly of driver chips of the back-end modulation process is an assembling technology to combine the driver chips with the LCD panel. There are various packaging types of the driver chip for LCD, such as quad flat package (QFP), chip on glass (COG), tape automated bonding (TAB), chip on film (COF), etc, wherein the COF structure has flexibility and smaller circuit pitches, so as to become the main technology of the package of driver chips.

Referring now to FIG. 1, a top view of a traditional COF structure is illustrated in FIG. 1. Specially explaining, for conveniently describing, FIG. 1 is shown in simplification, wherein the number of the traces is simplified, and some of details which are unrelated to the explanation are also omitted. As shown in FIG. 1, a COF structure of a liquid crystal panel comprises a flexible substrate 90, an output edge 91, a wire bonding portion 92, and a fan-out trace portion 93. The output edge 91 is disposed on an edge of the flexible substrate 90, and used to be connected with a liquid crystal panel (not shown). The wire bonding portion 92 having a plurality of lead strips (unlabeled) of elongated shape is disposed on the flexible substrate 90, and is located at a center of the flexible substrate 90. A long direction of the lead strips of the wire bonding portion 92 is perpendicular to the output edge 91. The fan-out trace portion 93 has a plurality of traces which are with a fan shape and respectively connect one end of the lead strips of the wire bonding portion 92 to the output edge 91. Besides, the wire bonding portion 92 are electrically connected with a driver chip (not shown).

As shown in FIG. 1, two sides of the wire bonding portion 92 are provided with wire bonding alignment marks 94. Because locations near two sides of the fan-out trace portion 93 are necessary to reserve a greater height D for layout, on one hand, it will occupy an available space of the fan-out trace portion 93, and on the other hand, it makes the height of the fan-out trace portion 93 increased, so that it is disadvantageous in a design trend of narrow frame edge of a liquid crystal panel.

As a result, it is necessary to provide a COF structure for a liquid crystal panel to solve the problems existing in the conventional technologies.

SUMMARY OF THE INVENTION

The present invention provides a chip on film (COF) structure for a liquid crystal panel, so as to solve the problem existing in the conventional technologies that a height of a fan-out traces is increased.

To achieve the above object, the present invention provides a COF structure for a liquid crystal panel, and the COF structure comprises:

a flexible substrate having an output edge connected with a liquid crystal panel;

a first wire bonding portion having a plurality of lead strips of elongated shape, which are disposed on the flexible substrate and located at a center of the flexible substrate, wherein a long direction of the lead strips of the first wire bonding portion is perpendicular to the output edge;

two second wire bonding portions having a plurality of lead strips of elongated shape, which are disposed on the flexible substrate and located at two sides of the first wire bonding portion, wherein a long direction of the lead strips of the second wire bonding portion is parallel to the output edge;

a fan-out trace portion having a plurality of traces with a fan shape, which connect one end of the lead strips of the first wire bonding portion to the output edge, respectively; and two array trace portions having a plurality of traces with a turning corner shape, which connect one end of the lead strips of the second wire bonding portions to the output edge, respectively.

In one embodiment of the present invention, the COF structure further comprises wire bonding alignment marks between the first wire bonding portion and the second wire bonding portions.

In one embodiment of the present invention, a width of the second wire bonding portion equals a length of the first wire bonding portion.

In one embodiment of the present invention, the first wire bonding portion and the second wire bonding portions are electrically connected with a driver chip.

In one embodiment of the present invention, the traces of the array trace portions have sharp turning corners.

In one embodiment of the present invention, the traces of the array trace portions have curved turning corners.

In one embodiment of the present invention, the flexible substrate further comprises an input edge, wherein the input edge is disposed on the other side opposite to the output edge and connected with a circuit plate.

To achieve the above object, the present invention further provides a COF structure for a liquid crystal panel, and the COF structure comprises:

a flexible substrate having an output edge;

a first wire bonding portion having a plurality of lead strips of elongated shape, which are disposed on the flexible substrate and located at a center of the flexible substrate, wherein a long direction of the lead strips of the first wire bonding portion is perpendicular to the output edge;

two second wire bonding portions having a plurality of lead strips of elongated shape, which are disposed on the flexible substrate and located at two sides of the first wire bonding portion, wherein a long direction of the lead strips of the second wire bonding portion is parallel to the output edge;

a driver chip disposed on the center of the flexible substrate, which is electrically connected with the first wire bonding portion and the second wire bonding portions;

a fan-out trace portion having a plurality of traces with a fan shape, which connect one end of the lead strips of the first wire bonding portion to the output edge, respectively; and two array trace portions having a plurality of traces with a turning corner shape, which connect one end of the lead strips of the second wire bonding portions to the output edge, respectively.

In one embodiment of the present invention, it is further provided with wire bonding alignment marks between the first wire bonding portion and the second wire bonding portions.

In one embodiment of the present invention, a width of the second wire bonding portion equals a length of the first wire bonding portion.

In one embodiment of the present invention, the traces of the array trace portions have sharp turning corners.

In one embodiment of the present invention, the traces of the array trace portions have curved turning corners.

In one embodiment of the present invention, the flexible substrate further comprises an input edge, wherein the input edge is disposed on the other side opposite to the output edge and connected with a circuit plate.

Hence, the present invention provides a COF structure for a liquid crystal panel, wherein the design of the second wire bonding portions parallel to the output edge and turning traces of the array trace portions can lower the height of the fan-out trace portion, so that it is advantageous in a design trend of narrow frame edge of a liquid crystal panel.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
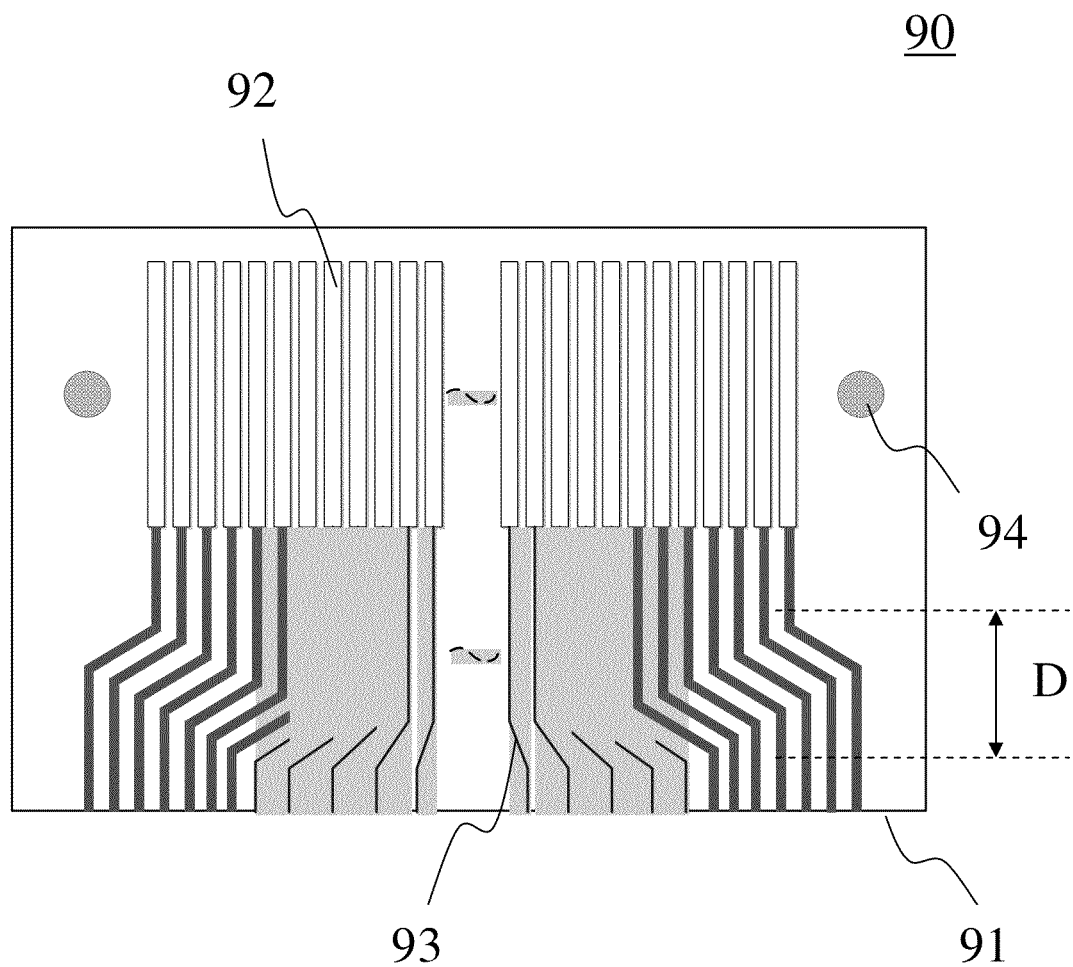
FIG. 1 is a top view of a traditional chip on film (COF) structure.
Figure 2:
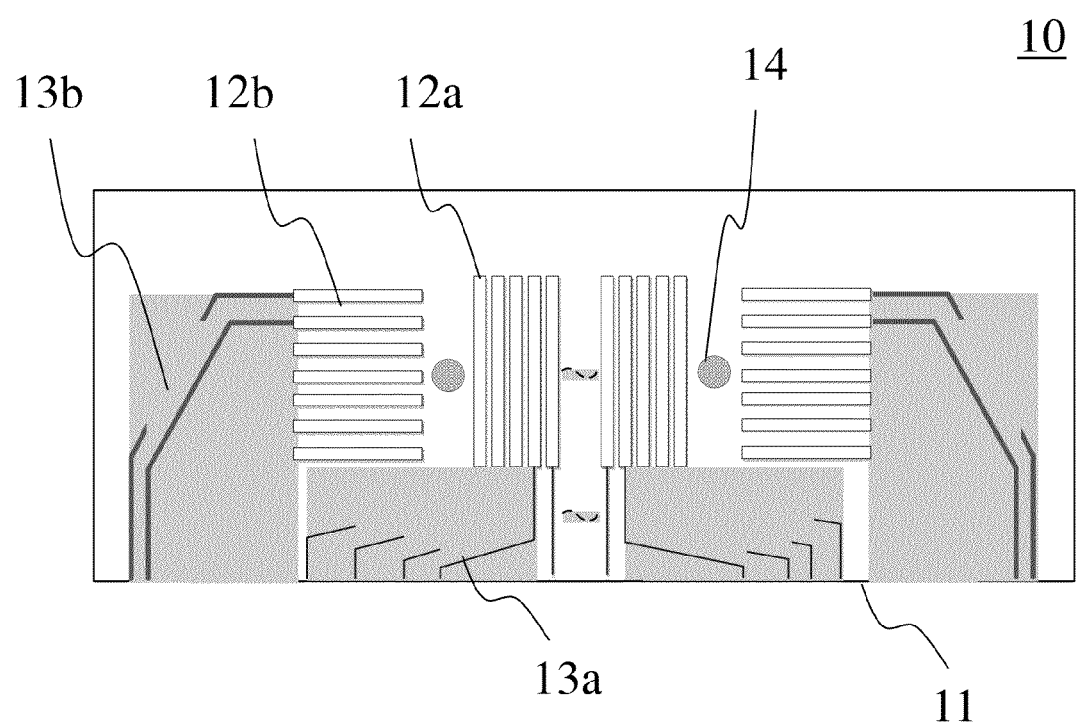
FIG. 2 is a top view of a preferred embodiment of a COF structure according to the present invention.

Referring now to FIG. 2, a top view of a preferred embodiment of a chip on film (COF) structure according to the present invention is illustrated in FIG. 2. Specially explaining, for conveniently describing, FIG. 2 is shown in simplification, wherein the number of the traces is simplified, and some of details which are unrelated to the explanation are also omitted. As shown in FIG. 2, a COF structure of a liquid crystal panel comprises a flexible substrate 10, an output edge 11, a first wire bonding portion 12a, two second wire bonding portions 12b, a fan-out trace portion 13a, and two array trace portions 13b. The output edge 11 is disposed on an edge of the flexible substrate 10, and used to be connected with a liquid crystal panel (not shown).

As shown in FIG. 2, the first wire bonding portion 12a has a plurality of lead strips (unlabeled) of elongated shape, which are disposed on the flexible substrate 10, and is located at a center of the flexible substrate 10. A long direction of the lead strips of the first wire bonding portion 12a is perpendicular to the output edge 11. Furthermore, the second wire bonding portions 12b have a plurality of lead strips (unlabeled) of elongated shape, which are disposed on the flexible substrate 10, and are located at two sides of the first wire bonding portion 12a. A long direction of the lead strips of the second wire bonding portion 12b is parallel to the output edge 11.

Moreover, the fan-out trace portion 13a has a plurality of traces which are with a fan shape and respectively connect one end of the lead strips of the first wire bonding portion 12a to the output edge 11; and the array trace portions 13b have a plurality of traces which are with a turning corner shape and respectively connect one end of the lead strips of the second wire bonding portions 12b to the output edge 11.

In the present invention, because the second wire bonding portions 12b in the two sides of the flexible substrate 10 can pass the turning traces of the array trace portions 13b to be connected with the output edge 11, the COF structure can lower the height of the fan-out trace portion 13a, so that it is advantageous in a design trend of narrow frame edge of a liquid crystal panel.

Preferably, the first wire bonding portion 12a and the second wire bonding portions 12b are used to be electrically connected with a driver chip (not shown). The driver chip is disposed in a center of the flexible substrate, and is electrically connected with the first wire bonding portion 12a and the second wire bonding portions 12b by way of wire bonding or flip chip.

Preferably, it is further provided with wire bonding alignment marks 14 between the first wire bonding portion 12a and the second wire bonding portions 12b, so that it is convenient for alignment of the driver chip.

Preferably, a width of the second wire bonding portion 12b approximately equals a length of the first wire bonding portion 12a.

Preferably, the traces of the array trace portions 13b have sharp turning corners (as shown in FIG. 2); or the traces of the array trace portions 13b are a mode of a curved turning corner.

Furthermore, in another preferred embodiment, the flexible substrate 10 can comprises an input edge (not shown), wherein the input edge is disposed on the other side opposite to the output edge, so as to be connected with a circuit plate (not shown).

As described above, in comparison with the traditional COF structure that because locations near two sides of the fan-out trace portion are necessary to reserve a greater height for layout, so as to occupy an available space of the fan-out trace portion, and to make the height of the fan-out trace portion increased, so that it is disadvantageous in a design trend of narrow frame edge of a liquid crystal panel. In the COF structure 10 of the present invention, the first wire bonding portion 12a is disposed in the center of the flexible substrate 10, and a long direction of the lead strips of the first wire bonding portion 12a is perpendicular to the output edge 11, wherein the fan-out trace portion 13a is connected one end of the lead strips of the first wire bonding portion 12a to the output edge 11; and the second wire bonding portions 12b are located at two sides of the first wire bonding portion 12a, and a long direction of the lead strips of the second wire bonding portion 12b is parallel to the output edge 11, wherein the array trace portions 13b are connected one end of the lead strips of the second wire bonding portions 12b to the output edge 11. In the present invention, the design of the second wire bonding portions 12b parallel to the output edge 11 and turning traces of the array trace portions 13b, it can lower the height of the fan-out trace portion, so that it is advantageous in a design trend of narrow frame edge of a liquid crystal panel.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A chip-on-film (COF) structure for a liquid crystal panel, characterized in that: the COF structure comprises:
    a flexible substrate having an output edge connected with a liquid crystal panel;
    a first wire bonding portion having a plurality of lead strips of elongated shape, which are disposed on the flexible substrate and located at a center of the flexible substrate, wherein a long direction of the lead strips of the first wire bonding portion is perpendicular to the output edge;
    two second wire bonding portions having a plurality of lead strips of elongated shape, which are disposed on the flexible substrate and located at two sides of the first wire bonding portion, wherein a long direction of the lead strips of the second wire bonding portion is parallel to the output edge;
    a fan-out trace portion having a plurality of traces with a fan shape, which connect one end of the lead strips of the first wire bonding portion to the output edge, respectively; and
    two array trace portions having a plurality of traces with a turning corner shape, which connect one end of the lead strips of the second wire bonding portions to the output edge, respectively;
    wherein a width of the second wire bonding portion equals a length of the first wire bonding portion; the top lead strips of the second wire bonding portions are flushed with the top end of the first wire bonding portion; and the bottom lead strips of the second wire bonding portions are flushed with the bottom end of the first wire bonding portion.

2. The COF structure according to claim 1, characterized in that: further comprising wire bonding alignment marks between the first wire bonding portion and the second wire bonding portions.

3. The COF structure according to claim 1, characterized in that: the first wire bonding portion and the second wire bonding portions are electrically connected with a driver chip.

4. The COF structure according to claim 1, characterized in that: the traces of the array trace portions have sharp turning corners.

5. The COF structure according to claim 1, characterized in that: the traces of the array trace portions have curved turning corners.

6. The COF structure according to claim 1, characterized in that: the flexible substrate further comprises an input edge, wherein the input edge is disposed on the other side opposite to the output edge and connected with a circuit plate.

7. A chip-on-film (COF) structure for a liquid crystal panel, characterized in that: the COF structure comprises:
    a flexible substrate having an output edge;
    a first wire bonding portion having a plurality of lead strips of elongated shape, which are disposed on the flexible substrate and located at a center of the flexible substrate, wherein a long direction of the lead strips of the first wire bonding portion is perpendicular to the output edge;
    two second wire bonding portions having a plurality of lead strips of elongated shape, which are disposed on the flexible substrate and located at two sides of the first wire bonding portion, wherein a long direction of the lead strips of the second wire bonding portion is parallel to the output edge;
    a driver chip disposed on the center of the flexible substrate, which is electrically connected with the first wire bonding portion and the second wire bonding portions;
    a fan-out trace portion having a plurality of traces with a fan shape, which connect one end of the lead strips of the first wire bonding portion to the output edge, respectively; and
    two array trace portions having a plurality of traces with a turning corner shape, which connect one end of the lead strips of the second wire bonding portions to the output edge, respectively;
    wherein a width of the second wire bonding portion equals a length of the first wire bonding portion; the top lead strips of the second wire bonding portions are flushed with the top end of the first wire bonding portion; and the bottom lead strips of the second wire bonding portions are flushed with the bottom end of the first wire bonding portion.

8. The COF structure according to claim 7, characterized in that: it is further provided with wire bonding alignment marks between the first wire bonding portion and the second wire bonding portions.

9. The COF structure according to claim 7, characterized in that: the traces of the array trace portions have sharp turning corners.

10. The COF structure according to claim 7, characterized in that: the traces of the array trace portions have curved turning corners.

11. The COF structure according to claim 7, characterized in that: the flexible substrate further comprises an input edge, wherein the input edge is disposed on the other side opposite to the output edge and connected with a circuit plate.

* * * * *